United States Patent [19]

McWhirter et al.

[11] 3,911,064
[45] Oct. 7, 1975

[54] SYSTEM FOR GAS SPARGING INTO LIQUID

[75] Inventors: John R. McWhirter, Westport, Conn.; Jon G. Albertsson, Grand Island, N.Y.

[73] Assignee: Union Carbide Corporation, New York, N.Y.

[22] Filed: Apr. 11, 1973

[21] Appl. No.: 350,795

Related U.S. Application Data

[63] Continuation-in-part of Ser. No. 132,483, April 8, 1971, Pat. No. 3,775,307, which is a continuation-in-part of Ser. No. 32,070, April 27, 1970, abandoned.

[52] U.S. Cl. .................. 261/87; 210/14; 210/220
[51] Int. Cl.² .................................. B01F 3/04
[58] Field of Search .......... 261/87; 210/14, 15, 220, 210/221

[56] References Cited
UNITED STATES PATENTS

| | | | |
|---|---|---|---|
| 1,124,855 | 1/1915 | Callow et al. | 261/87 |
| 2,041,184 | 5/1936 | Isenhour | 261/87 |
| 2,928,661 | 3/1960 | Maclaren | 261/87 X |
| 3,775,307 | 11/1973 | McWhirter et al. | 210/14 |

*Primary Examiner*—Frank W. Lutter
*Assistant Examiner*—William Cuchlinski, Jr.
*Attorney, Agent, or Firm*—J. C. LeFever

[57] ABSTRACT

A system for sparging gas into liquid as for example oxygen into waste liquid containing organic solids, wherein the gas is injected as at least one gas stream orbited around a common vertical axis to scribe a swept area bounded by circles of minimum and maximum radii, thereby forming small gas bubbles in the sparging zone.

2 Claims, 11 Drawing Figures

SYSTEM FOR GAS SPARGING INTO LIQUID

CROSS REFERENCE TO RELATED APPLICATIONS

This application is a continuation-in-part of Ser. No. 132,483 filed Apr. 8, 1971 and issued as U.S. Pat. No. 3,775,307, which is itself a continuation-in-part of Ser. No. 32,070 filed Apr. 27, 1970 now abandoned, both in the names of Jon G. Albertsson and John R. McWhirter.

BACKGROUND OF THE INVENTION

This invention relates to a method of and apparatus for sparging gas into liquid in the form of small bubbles.

Mass transfer processes between gases and liquids are commonly carried out by producing bubbles of the gas in the liquid. Mass transfer occurs at the gas-liquid interfaces generated in the two-phase system, and the greater the interfacial area, the faster and more efficiently the process proceeds.

The efficiency of such aeration processes is greatly improved if the gas can be introduced into the liquid as tiny bubbles on the order of 0.04–0.16 inches in diameter. For example, comparing bubbles of 0.1 and 0.24 inches average diameters, the gas-liquid interfacial surface area produced by one cubic foot of gas is about 720 sq. ft. and 300 sq. ft., respectively. The production of small bubbles with large area increases the rate of mass exchange between the gas and the liquid. In gravity systems, it also slows the rate of bubble rise due to buoyancy and hence increases the time available for mass transfer. Once formed in the mixed liquor, tiny bubbles show less tendency to coalesce than do larger bubbles, and therefore, the area advantage of small bubbles is even greater in practice than indicated by the initial bubble size.

When a small volume of gas is to be introduced into a large volume of liquid, a sparging system is often used. By providing tiny orifices in the sparger, or fabricating the sparger of a porous metal, very small bubbles can be produced with a large gas-liquid interfacial area. Such spargers are commonly located at the bottom of a tank so that the bubbles rise slowly through the liquid. In large tanks, the sparger in the form of a long perforated pipe can be rotated slowly in a horizontal plane and thereby release a moving cloud of bubbles throughout the entire body of liquid.

Some aeration processes involve liquids containing suspended solids (hereinafter called mixed liquors) and it is very difficult to product tiny bubbles in such liquids, particularly when the solid particles are soft and adherent. Such solids quickly clog the pores or orifices in the sparger and make the process difficult to control and expensive to maintain. Orifices (openings) can be operated successfully in such mixed liquors if they are relatively large in diameter, e.g., ⅛ inch or above. However, it is well known that bubbles produced from submerged openings will grow to a size much larger than the openings before breaking away. Thus, the smallest average-sized bubbles which can be produced by prior art sparging systems from a practically-sized, ⅛ inch opening, are at least ¼ inch in diameter and afford less than 300 sq. ft. gas-liquid interfacial area per cu. ft. of gas.

Non-limiting examples of mass transfer processes involving suspended solids are fermentation processes and the activated sludge process for waste disposal.

The present invention is especially advantageous for use in an activated sludge process wherein gaseous oxygen is dissolved in waste liquids containing organic solids. The benefits of small bubbles and rapid, efficient oxygen solution are very important when the oxygen-source gas is high in oxygen content or is pure oxygen. With the conventional air aeration of waste liquor, the source gas is available at the cost of its compression only. However, an oxygen-enriched source gas has a higher value, and must be effectively utilized in the activated sludge process for replacement of air.

The activated sludge process can benefit from easier, faster solution of oxygen from the source gas in one or more of the following ways:

1. More complete utilization of the oxygen available in the source gas.
2. Reduced power costs for compression of the source gas.
3. Reduced power costs for agitation of the mixed liquor.
4. Higher dissolved oxygen content of the mixed liquor.
5. Reduced retention time of mixed liquor in the aeration basins.

An object of this invention is to provide an improved method of and apparatus for sparging gas into liquid, including mixed liquor.

Another object is to provide such method and apparatus in which the gas is injected into the liquid through openings sufficiently large to avoid clogging thereof, yet form gas bubbles in the bulk liquid which are no longer than the openings and which are uniform in size.

Still another object is to provide such method and apparatus for sparging oxygen gas into waste liquor and sludge.

Other objects and advantages on this invention will be apparent from the ensuing disclosure and appended claims.

SUMMARY

These objects are achieved by the present invention which employs relatively large non-plugging gas injection openings yet is capable of producing bubbles of about 0.04–0.19 inch in diameter and of an average size no larger than the gas injection opening diameter.

In the method aspect of the invention, at least one gas stream is injected into liquid at lineal velocity of at least 5 feet per second and at volumetric flow rate of at least 0.06 actual cubic feet per second per square foot of horizontal area in a sparging zone as gas bubbles. The gas stream is simultaneously orbited at tangential velocity of 4.5–33 feet per second and at rate such that the factor $N^2D^2$ is at least 15 feet$^2$ per second$^2$ about a common vertical axis so as to scribe a swept area when projected on the horizontal plane bounded by circles of minimum and maximum radii each perpendicular to said vertical axis. It should be understood that both circles may in fact be in the horizontal plane so that such projection would not be necessary.

This method includes a relationship of the total cross-sectional area of the gas stream to the aforementioned swept area. In particular the ratio of total cross-sectional area of the gas stream to the swept area is 0.006–0.06. As a result of the foregoing steps, a multiplicity of discrete gas bubbles of 1/32–¼ inch are formed in the sparging zone.

Also according to the method, the liquid is flowed at lineal velocity of at least 2 feet per second downwardly through the sparging zone for gas injection therein, and the downwardly flowing gas bubble-containing liquid is discharged from the lower end of the sparging zone.

In one particular method of this invention, the aforementioned gas stream is subdivided into a multiplicity of discrete gas streams of 1/32–¼ inch effective diameter. These gas streams are orbited as a multiplicity of circles of different radii but all falling within the aforementioned swept area.

In the apparatus aspect of the invention, a vertically oriented rotatable shaft is provided having a passageway therein joined at its upper end to pressurized gas supply means. An axial flow impeller is fixedly attached to the rotatable shaft with outwardly extending blades intermediate the shaft upper end and lower end and being aligned to flow liquid downwardly.

A multiplicity of gas sparging arms are also fixedly attached to the rotatable shaft at its lower end. Each arm extends radially outwardly from and the arms are spaced around the shaft with an interior passageway communicating with the rotatable shaft passageway and a multiplicity of 1/32–¼ inch effective diameter openings spaced from each other along the arm length with the center axis of said openings having a vertical direction component. The diameter scribed by the arm tips is 0.8–1.1 times the diameter scribed by the impeller blade tips. In a preferred embodiment without shrouding, the horizontal center plane of the sparging arms is positioned beneath the impeller horizontal center plane no more than a distance equal to the impeller blade tip scribed diameter. The gas sparging arms and injection openings are arranged so as to scribe a multiplicity of circles each perpendicular to the rotatable shaft but at different radii with all such circles when projected on the horizontal plane falling within a swept area bounded by the circles of minimum and maximum radii. As with the method of invention, gas injection openings may all rotate in the same horizontal plane so that projection thereto is not necessary.

In this apparatus the gas injection openings are also provided in sufficient size and number such that the ratio of total cross-sectional area of the openings to the aforementioned swept area is 0.006–0.06. The apparatus also includes a multiplicity of fixed vertical radial baffles at spaced intervals around the lower end of the rotatable shaft to inhibit the tangential movement of liquid in this vicinity which if excessive would otherwise reduce mixing efficiency and mass transfer efficiency of gas thereto.

DESCRIPTION OF PREFERRED EMBODIMENTS

Figure 1:
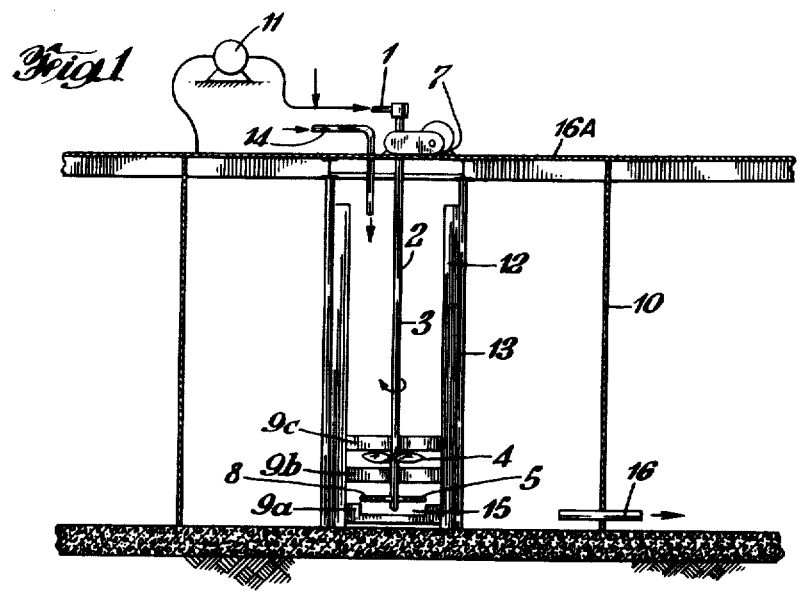
FIG. 1 is a schematic view taken in cross-sectional elevation of a ground-positioned system for sparging gas into liquid according to one embodiment of the invention.

Referring now to the drawings and in particular FIGS. 1–6, pressurized gas is introduced through conduit 1 to vertically oriented rotatable shaft 2 having passageway 3 therein joined at its upper end to conduit 1. Axial flow impeller means as for example propeller 4 is fixedly attached to shaft 2 intermediate the latter's upper end and lower end with outwardly extending blades. A multiplicity of gas sparging arms 5 are fixedly attached to rotatable shaft 2 at its lower end. Each arm extends radially outwardly from the shaft and has an interior passageway 6 communicating with the rotatable shaft passageway 3. Shaft 2 is driven by an appropriate power source as for example motor 7.

A multiplicity of 1/32–¼ inch effective diameter openings 8 as for example orifices are spaced from each other and preferably at least two center-to-center effective diameters along the arm length. This spacing is preferred, if it is desired to maintain distinct, separate gas injection streams of similar size to the characteristically small bubbles formed in the sparging zone. As used herein the phrase "effective diameter" includes non-circular as well as circular openings, and refers to the diameter of the largest circle which can be inscribed within the the openings. For non-circular openings the preferred center-to-center spacing refers to the distance between the closest of such largest circles which can be inscribed in adjacent openings. The center of axes x—x of these openings 8 has a vertical direction component so as to scribe a multiplicity of circles (as for example $C_{-1}$ and $C_{-11}$ of FIG. 3) each in a plane perpendicular to the rotatable shaft 2. A vertical direction component of the axes is necessary to maximize the horizontal shearing action of liquid on the gas bubbles emerging from openings 8 into the liquid, as discussed hereinafter in connection with FIG. 6. When all such circles $C_{-1}$ and $C_{-11}$ are projected on the horizontal plane p—p of FIG. 4, they fall within a swept area bounded by the circles of minimum radii $r_{mi}$ and maximum radii $r_{ma}$. It will be noted that the FIG. 3–4 sparger embodiment has all such circles in the horizontal plane p—p and projection thereto is unnecessary. However, it is contemplated that arms 5 may be positioned inclined from the horizontal with tips either upwardly toward or downwardly away from the axial flow impeller 4, as for example to form a cone-shaped assembly (see dotted lines in FIG. 4). In this event it would be necessary to project $r_{mi}$ and $r_{ma}$ to the horizontal plane $p—p$ to form the swept area. All arms 5 are preferably in the same horizontal plane $p—p$ of rotation in order to minimize the difference in hydrostatic head acting upon the openings 8 within the sparging zone.

Openings 8 are provided in sufficient size and number such that the ratio of their total cross-sectional area to the swept area is 0.006–0.06, preferably with 0.125–20 openings per square inch of swept area in the embodiment employing spaced small orifices to discharge a multiplicity of discrete small gas streams. That is, to achieve the improvements of this invention the openings must be provided within certain ranges in terms of total area. If the total cross-sectional area is less than 0.006 of the swept area, the efficient mass transfer of gas to liquid is limited by insufficient quantity of available gas with respect to the power required to rotate the sparger, and if the ratio exceeds 0.06 the relative quantity of gas is so high that the flowing liquid is unable to effectively sweep the bubbles from the sparging zone rapidly enough to avoid bubble congestion and coalescence into excessively large bubbles, i.e. larger than ¼ inch effective diameter. Moreover for a given total gas flow through the sparger, excessive orifice area results in inadequate orifice head loss to avoid weeping into the sparger arms through some of the orifices with consequent partial inactivity of the sparger.

If fewer than 0.125 openings per square inch of swept area are provided in the small orifice-type embodiment, the mass transfer of gas to liquid is also limited by either insufficient quantity of gas with respect to the power expended to rotate the sparger (at satisfactory gas flow rates) or by the ¼ inch diameter upper limit on the opening size. If there are more than 20 openings per square inch of swept area, the openings are so closely spaced as to result in a degree of bubble coalescence.

In a preferred embodiment of the apparatus from the standpoint of gas-to-liquid mass transfer rate and small bubbles, the openings 8 and ⅛ inch diameter, the ratio of total cross-sectional area of openings to the swept area is 0.008–0.04 with 1–4 openings per square inch of swept area.

The size and position of the sparger relative to the impeller is important for obtaining high rates of mass transfer. The sparger should be located substantially within the downward flowing liquid stream from the impeller and relatively near the impeller where liquid velocity is high. Substantially the full cross section of the liquid stream should be used for gas mixing in order to avoid bubble congestion to aid bubble dispersion through the bulk liquid and to maximize the concentration gradients for high mass transfer.

In order that the sparger zone occupy the full cross-sectional area of the liquid stream the diameters scribed by the sparger arm tips and the impeller blade tips should be approximately equal. Since the liquid stream may diverge upon leaving the impeller the sparger diameter may be slightly greater than the impeller diameter, but in any event the scribed diameter ratio, sparger arm tips/impeller blade tips, should not exceed about 1.1. Similarly, the sparger diameter may be slightly less than the impeller diameter without incurrent severe detrimental effects due to the aforementioned bubble congestion, poor dispersion and reduced mass transfer. However the scribed diameter ratio, sparger arm tips/impeller blade tips, should not be less than 0.8 and preferably should not be less than 0.9.

The divergence of the liquid streams below the impeller is accompanied by a progressive reduction in liquid velocity at greater distances from the impeller. This divergence is accentuated when the impeller-sparger assembly is positioned near the bottom of a basin of liquid so as to effectively mix and suspend solids contained therein. Reduced liquid velocities are detrimental because the liquid does not sweep the bubbles as effectively from the sparging zone and the propeller-sparger system tends to flood. For this reason when shrouding is not provided around the impeller-sparger assembly, the horizontal center plane of the sparger arms should be positioned beneath the horizontal center plane of the impeller no more than a distance equal to the impeller blade tip scribed diameter and preferably not exceeding one-half the impeller blade tip scribed diameter. As used herein the horizontal center plane of the sparging arms is located at and passes through the horizontal center line of the gas passageway connector between the rotatable shaft and the lowermost sparger arm. For example in FIG. 4, the horizontal center plane of the sparging arms is indicated by line $p—p$. As used herein the horizontal center plane of the impeller blades is a plane midway between the planes bounding the blading on top and on bottom. The vertical distance between the sparger and impeller horizontal center planes is shown in FIG. 1 as "$s$."

Table I lists illustrative sparger embodiments of the invention, each employing eight horizontal arms with ⅛ inch diameter openings.

TABLE I

| Sparger No. | Rotatable Opening $R_{mi}$ | Axis to center-inches $R_{ma}$ | Distance between Adjacent Openings-Diameters | Swept Area-in.² | Open Area/Swept Area | Openings/in.² Swept Area | Sparger Diameter tip to tip-in. | Impeller Diameter tip to tip-in. | Impeller to Sparger Distance-in. |
|---|---|---|---|---|---|---|---|---|---|
| 1 | 2.76 | 27.5 | 4 and 3 | 2350 | 0.013 | 1.04 | 55 | 56 | 24 |
| 2 | 3.5 | 25.0 | 4 and 3 | 1930 | 0.009 | 0.72 | 55 | 52 | 24 |
| 3 | 1.4 | 7.0 | 3 | 148 | 0.019 | 1.51 | 14 | 14 | 12 |
| 4 | 1.4 | 8.8 | 3 | 235 | 0.016 | 1.3 | — | — | — |
| 5 | 3.0 | 8.6 | 3 | 206 | 0.028 | 2.5 | 18 | 18 | 13.25 |
| 6 | 3.0 | 8.6 | 3 | 206 | 0.021 | 1.7 | 18 | 18 | 13.25 |
| 7 | 3.2 | 6.6 | 3 | 105 | 0.038 | 3.05 | 14 | 14 | 12 |
| 8 | 3.2 | 6.6 | 3 | 105 | 0.019 | 1.52 | 14 | 14 | 12 |

To minimize vortex flow of liquid in the sparging zone, a multiplicity of vertical baffles are radially positioned at spaced intervals around the lower end of rotatable shaft 2. These baffles may for example be in the form of narrow radial baffles 9a, 9b and 9c extending from and supported by the inner wall of container 10 (support means not illustrated). These baffles are located at spaced intervals around the shaft 2 perimeter, e.g., 90°, and preferably positioned in a spoke-like configuration. As illustrated in FIG. 1, vertical radial narrow baffles may be located either slightly below 9a at the same level 9b or above the sparger arms 8 9c. Relatively long vertical baffles 12 may be radially positioned around the shaft 2 perimeter, e.g., at 90°intervals using support means well understood by those skilled in the art, as for example, vertical posts 13. These vertical radial baffles 12 may be employed in combination with or instead of narrow baffles 9 to prevent the liquid from spinning in small transverse circles to form vortexes. If this occurs, the relative velocity between the sparger arms and the liquid would be significantly reduced, thereby undesirably reducing the liquid's shearing action on gas bubbles emerging from the openings 8 and reducing the developed turbulence in the wake of the sparger arms. The number and position of vertical radial baffles to eliminate spin-flow of liquid may be empirically determined for each particular configuration, but in general the problem is more severe in relatively small diameter sparging zones, hence more baffles are needed. The baffles required by the apparatus of this invention also reduce the tendency towards flooding at high gas flow rates and at a particular $N^2D^2$ factor level (discussed hereinafter in detail) and liquid velocity the baffles increase the maximum allowable gas flow rate before flooding occurs.

The feed liquid to be sparged with gas may be introduced at any elevation of container 10 through a suitable conduit 14 and is flowed downwardly by impeller 4 to the sparging zone 15. Gas-containing liquid is discharged from the lower end of zone 15 and may exit through conduit 16 at the lower end of container 10, or alternatively could pass through a passageway near the upper end of container wall, or over a weir. In general, the liquid inlets and outlet may be at the same or opposite ends of the storage container 10 but should be transversely spaced from each other for adequate liquid residence time, e.g. on the order of 30 minutes.

The portion of sparged gas rising to the liquid surface and disengaging therefrom may be released to the surrounding environment, or discharged from an enclosed overhead gas space for further use, or recirculated by pump 11 to gas feed conduit 1. The gas may for example be sparged into the liquid for stripping undesired material therefrom. In this event, the disengaged gas will usually be discharged from the overhead gas space and not recirculated.

Figure 5:
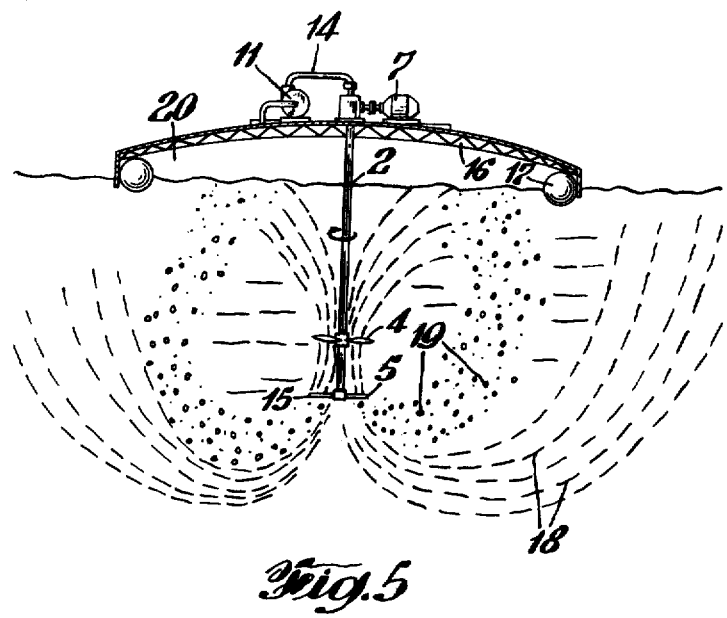
FIG. 5 is a schematic view taken in cross-sectional elevation of a floating system for sparging gas into liquid according to another embodiment of the invention.

FIG. 5 illustrates floating apparatus which could be used for practicing this sparging method in a naturally occurring large liquid body, e.g. a lagoon. The same numbers have been used for identifying elements corresponding to those in the FIG. 1-2 apparatus. Dome or cover 16 is supported by floats 17, and the required machinery is positioned thereon, e.g. gas recirculation pump 11 and conduit 14, rotatable shaft 2 with propeller 4 and sparger 5 positioned thereon, and motor 7 for driving shaft 2. If vertical radial baffles were provided, they might be suspended from the dome or supported from the lagoon bottom. The gas supply means and provision for delivering electric power to the sparger assembly are not shown in the interest of simplicity. The liquid flow is indicated by dashed lines 18 and preferably extends laterally beyond the dome after downward passage through the sparging zone for receiving gas bubbles. The gas bubbles 19 flow more directly upward to the liquid body surface due to the upward force of buoyancy. Accordingly the gas bubbles reaching the liquid surface are captured in the overhead space beneath an appropriately sized dome 16 and are recirculated by pump 11.

Figure 6:
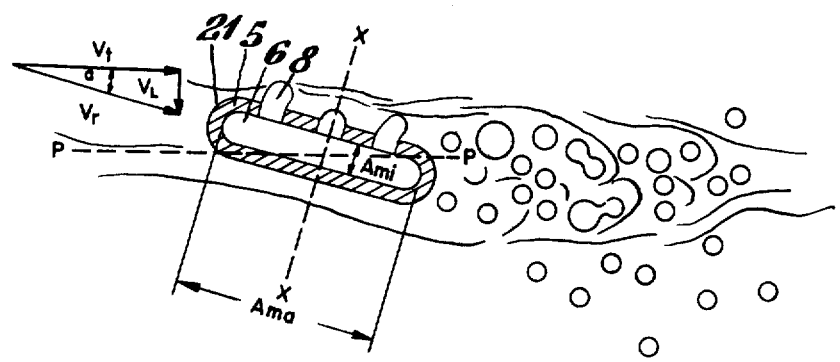
FIG. 6 is an enlarged end view taken in cross-section of a sparger arm section, also showing the various flow and direction relationships of this invention.

Referring now in detail to the method of the invention and in particular FIG. 6, the gas streams are injected into liquid in the sparging zone 15 at lineal velocity $V_1$ of at least 5 ft. per second (fps), for example along the line $x$—$x$. Lineal velocities below 5 fps. permit weeping of liquid downwardly through openings 8 into passageway 6. As previously indicated, the gas is introduced at volumetric flow rate of at least 0.06 actual cubic feet per second per square of horizontal area and preferably at least 0.10 ft.$^3$/sec. x. ft.$^2$ in the sparging zone. The expression "actual cubic feet" refers to the gas volume measured under the conditions prevailing in the sparging zone, i.e. adjusting the gas volume at standard temperature and pressure to the temperature and hydrostatic head in the zone. The expression "horizontal area" refers to the total area inscribed by the rotating sparger arm tips, and exceeds the previously defined swept area. It will be recognized that considerable power is required to achieve the aforementioned liquid shearing and turbulence effects in the sparging zone. Unless the gas is introduced at least at this volumetric flow rate, there will be insufficient gas available to effectively utilize this power or to realize the high gas-to-liquid mass transfer coefficients possible with the method and apparatus of the invention.

Simultaneously with the aforedescribed lineal velocity $V_1$, the gas streams are orbited at tangential velocity $V_t$ of 4.5–33 feet per second (fps). The tangential velocity for any particular gas stream may be determined by the formula: (revolutions per second) × ($\pi$) (diameter of circle), and represents the sparger movement in the horizontal plane $p$—$p$. With the aforedescribed vertical radial baffles 9a–9c and 12, it may be assumed that the liquid movement in the horizontal plane is substantially zero and constitutes drag, so that the tangential velocity $V_t$ is representative of the shearing action of the liquid on the gas bubbles and also representative of the turbulence produced in the liquid by the rotating sparger arm. If the tangential velocity is less than 4.5 fps., insufficient shearing action and turbulence is provided to release the gas bubbles from opening 8 before the bubbles grow excessively large and/or to subdivide any large bubbles which may be formed in he sparging zone. Where $V_t$ is greater than 4.5 fps. the shearing force in effect tears each bubble from the opening 8 mouth long before its growth alone would produce sufficient buoyant force to cause the separation. Moreover the turbulence produced in the wake of the rotating arms reduces any large bubbles to a small size which can exist in stable form in the high liquid shear regime.

The tangential velocity $V_t$ of the orbiting gas streams should be less than about 33 fps. to avoid the cavitation phenomenon which occurs when the pressure on the trailing side of a spinning rotor arm falls below the vapor pressure of the liquid at that point. The resultant low pressure gas pocket or vacuole produces large bubbles which is contrary to the objectives of this invention. Moreover, bubbles already suspended in the liquid tend to collapse into a zone of cavitation. The threshold velocity for cavitation cannot be theoretically predicted with close accuracy because the onset is dependent upon many other factors in addition to rotor speed, e.g. rotor shape, system pressure and gas lineal velocity. Cavitation-type spargers are well known in the art and literature sources indicate that the rotor speed (at which cavitation occurs) varies considerably for different apparatus.

In the factor $N^2D^2$, N is the speed of sparger arm and impeller blade rotation (in revolutions per second), and D is the diameter of the circle which is circumscribed by the tips of the sparger arms (in feet). This factor is representative of the energy developed by the sparger in the sparging zone in the form of turbulence and shear of the liquid acting on the gas bubbles at the orifice mouth openings and in the wake of the rotating arms. Accordingly the factor $N^2D^2$ influences the size of bubbles discharged from the sparging zone. It has been discovered that with gas volumetric flow rates above 0.06 actual cubic feet per second/ft.$^2$ horizontal area and to achieve high gas-to-liquid mass transfer rates, the factor $N^2D^2$ must be at least 15 ft.$^2$/sec.$^2$, preferably at least 20 ft$^2$/sec.

Another requirement of this method is flowing the liquid at lineal velocity $V_d$ of at least 2 fps. downwardly through the sparging zone 15 and preferably 3–7 fps. This velocity of at least 2 fps. is needed to sweep the bubbles from the sparging zone immediately after they are formed and detached. Such velocity is also needed when solids are present to maintain a uniform suspension in the liquid. A liquid velocity $V_d$ not greater than 7 fps. is preferred to insure sufficient contact time for efficient gas transfer to the liquid and to avoid unnecessary energy loss by virtue of repeated liquid acceleration and deceleration. The liquid lineal velocity $V_d$ of course exceeds the terminal velocity of gas bubbles in liquid, i.e. about 0.8 fps. for ⅛ inch diameter bubbles and slightly higher for larger bubbles.

The liquid lineal velocity may for example be provided by an external pump, but in the apparatus of this invention such velocity $V_d$ is provided by axial flow impeller 4 as for example a propeller. When the liquid contains suspended solids, impeller 4 not only serves to impart the desired downward flow velocity but also serves to mix the liquor so that the solid is substantially uniformly distributed therein. Impeller 4 of course mixes the gas in the liquid. When the impeller serves to keep solids in suspension, the horsepower required for this function is the major part of the total required power input to the rotatable shaft. For example, in an oxygen gasbiological waste water liquor sparging system this requirement is on the order of 0.08 horsepower per 1,000 gallons waste liquor.

In embodiments wherein the rotating impeller 4 and sparging arms 5 are longitudinally surrounded by container walls 10 and the container bottom end, the general flow pattern of the liquid in the sparging zone 15 may be described as a rolling action. After flowing downwardly through zone 15 for admixture with gas bubbles from the rotating sparger arm surfaces, the liquid reaches the container bottom and flows outwardly to the corners and upwardly along the container walls. Impeller 4 then circulates this liquid inwardly and again down over the rotating sparger arm 5 to repeat the bubble sweeping action. The velocity of this rolling action is low as compared to the downflow liquid velocity in the sparging zone. In embodiments lacking container walls and a bottom as for example the FIG. 5 apparatus, this rolling liquid flow still occurs but not to as great a degree. In general, the rolling liquid flow should not be appreciably greater than required to maintain solids in suspension and/or to disperse the gas bubbles uniformly through the liquid. If the rolling liquid flow is excessive, then an unnecessarily large quantity of liquid is being pumped with excessive power consumption.

As previously indicated, the ratio of total cross-sectional area of the gas stream or streams to the swept area between $r_{mi}$ and $r_{ma}$ is 0.006–0.06 and preferably 0.008–0.04. A ratio below 0.006 does not provide sufficient gas-liquid contact area for high rate mass-transfer or effectively utilize the power consumed in treating liquid shear and turbulence. Ratios above 0.06 do not obtain sufficient head loss across the orifices to avoid weeping of liquid into the sparger arm through some of the orifices. Weeping is particularly detrimental when solids are present in the liquid, because circulation of liquid through the sparger arm can be continuous. As the sparger turns, centrifugal force promotes circulation of liquid from orifices near the center of rotation to orifices near the tip of the arm. Solids entering the sparger arm will accumulate and eventually plug the channel through the arm as well as a substantial number of outer orifices. According to the method embodiment employing small discrete gas streams, 0.125–20 gas streams per square inch of swept area are preferably injected into the downwardly flowing liquid as bubbles, and more preferably 1–4 gas streams per square inch of swept area. If fewer than 0.125 gas streams are provided, insufficient gas is available for a maximized gas transfer rate to the liquid in view of the ¼ inch diameter upper limit. If more than 20 gas streams are used, they are so closely spaced as to produce a degree of bubble coalescence in view of the 0.006 total cross-sectional area/swept area lower limit.

In one method embodiment, oxygen gas is sparged into waste liquor containing organic solids, comprising the steps of injecting a multiplicity of discrete oxygen gas streams of ⅛ inch diameter spaced at 2.5–3.5 center-to-center diameters apart at a gas flow rate of at least 0.1 actual ft.$^3$/sec.-ft.$^2$ of horizontal area in the sparging zone into waste liquor as gas bubbles in the vertical direction, and simultaneously orbiting the gas streams at tangential velocity of at least 5 fps. about a common vertical axis so as to scribe a multiplicity of circles each perpendicular to the vertical axis but at different radii with all such circles in the same horizontal plane falling within a swept area bounded by the circles of minimum and maximum radii, the ratio of total cross-sectional area of the gas streams to the swept area being 0.008–0.04 with 1–4 gas streams per square inch of swept area. The waste liquor is flowed at lineal velocity of 3–7 feet per second downwardly through the sparging zone for gas injection therein, and the downwardly flowing gas bubble-containing liquid is discharged from the lower end of the sparging zone.

Figure 4:
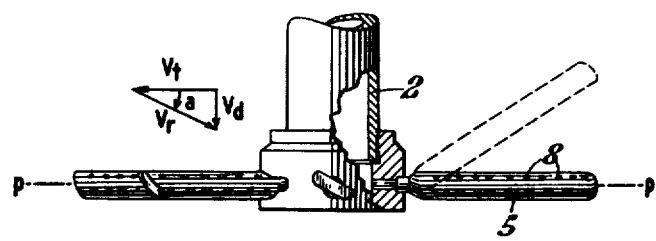
FIG. 4 is an elevation view taken along line 4—4 of the FIG. 3 assembly.

It will be noted from FIGS. 4 and 6 that arms 5 are not necessarily transversely oriented horizontally along line p—p but instead may be positioned at included angle "a" to p—p. The reason for this transverse inclination is to align the sparger arm outer surface (from which the gas bubbles are discharged) parallel with the resultant direction of the relative liquid flow $V_r$. This relationship avoids pumping of the liquid either upwardly or downwardly by the rotating sparger arms, and thereby minimizes the power required to rotate the sparger. As shown in the vector diagrams, the tangential velocity $V_t$ is only one component of the relative liquid velocity $V_r$. The other component $V_d$ is produced by the liquid impeller 4 (located above the sparger arms 5) which pumps liquid downwardly approximately parallel to the axis of shaft rotation.

The FIG. 6 vector diagram shows how the vector angle $a$ of transverse inclination of the sparger arms may be derived from a summation of velocity components $V_t$ and $V_d$. In contrast to FIG. 4, the FIG. 6 downward velocity component $V_d$ is not vertical and may in practice be inclined due to a horizontal velocity component imparted to the liquid by the impeller. The vector angle of $V_r$ is usually on the order of 5°–15°, and the angle $a$ of sparger arm transverse inclination is also preferably in this range.

FIG. 6 also illustrates the preferred substantially flat cross-section for the sparger arms with the major axis $A_{ma}$ normal to the gas injection opening center axis and at least twice the length of the minor axis $A_{mi}$ parallel to such gas injection opening. This configuration is preferred to minimize power consumption and stress on the rotating arms. That is, the force imparted by the liquid in resultant direction $V_r$ on the sparger arm is reduced in proportion to the projected area of the arm in the path of this force. This projected area is minimized and in this preferred embodiment is represented by the relatively narrow leading surface of the sparger arm having a height of $A_{mi}$ (the minor axis).

Figure 3:
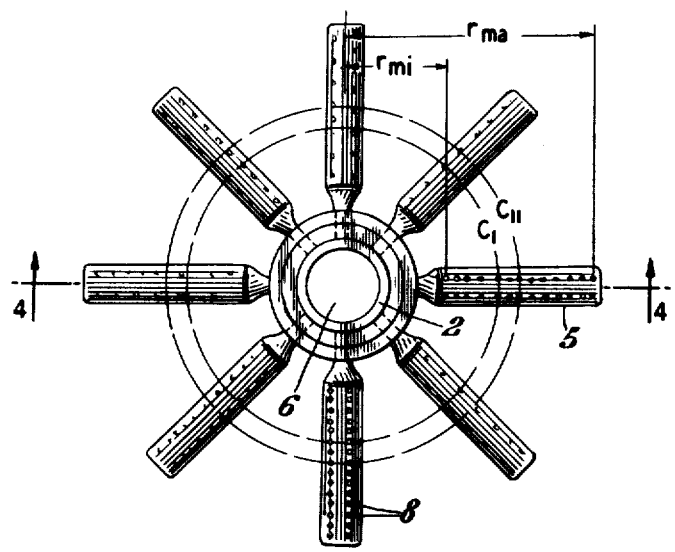
FIG. 3 is a plan view of a suitable sparger arm assembly for use with the FIG. 1–2 system.

The advantages of this invention were illustrated in a series of tests employing a sparger similar to the FIGS. 3–4 embodiment in a system similar to that illustrated in FIG. 1 for introducing oxygen gas into water. The 11 inch diameter sparger consisted of eight flattened tubular arms capped at the outer ends and joined at the inner ends to a hollow hub and shaft through which oxygen was introduced. Each arm was drilled with eight 1/8 inch diameter openings equi-spaced between 1.75 and 5.25 inch radii, i.e. the spacings were about four center-to-center diameters apart. With this sparger, the ratio of total cross-sectional area of the openings (and the gas streams injected therefrom into the liquid) to the swept area was 0.01, with 0.83 openings (and gas streams) per square inch of swept area. The sparger was surrounded by an 11 5/6 inch inside diameter shroud.

In these tests the speed of rotation of the sparger was varied and the fluid (gas and liquid) flow rates were varied. The sparger (and shroud) was mounted in the bottom of a small cylindrical column connected at top and bottom with an adjacent tank containing water. A pump with means for controlling the discharge rate was provided between the tank and the top of the column whereby the downward flow rate of water through the sparging zone could be regulated and maintained at a desired value. Accordingly, an axial flow impeller was not required or provided for these particular tests. In the interests of demonstrating capability of these devices to produce small bubbles, the plugging problem was ignored and the circulating liquid was clean water uncontaminated with solid particles of appreciable size.

Comparative tests were also conducted with a stationary (non-rotating) sparger. The stationary sparger was provided with sixteen very small 1/32 inch diameter orifices. These orifices were drilled in eight tubular arms of a configuration similar to FIGS. 3–4 having an overall inscribed circle diameter of 11 inches. The arms were 1/4 diameter tubes with two orifices per arm spaced about 4 inches apart. The results of the tests are summarized in Table II.

TABLE II

| Test No. | Gas Stream Tangential Velocity ft./sec. Inner Opening | Outer Opening | Sparger | Sparger RPM | Gas Flow ft³/sec. -ft.² | Gas Lineal Velocity ft./sec. | $N^2D^2$ ft²/sec.² | $H_2O$ Flow ft./sec. | Average Bubble Size Inches | Bubble Size Uniformity | Bubble Stability | Area Ratio* | Gas Stream Number Ratio** |
|---|---|---|---|---|---|---|---|---|---|---|---|---|---|
| 1 | 8.5 | 25.4 | Rotating | 554.7 | $5.8 \times 10^{-6}$ | 0.56 | 69.3 | 0.329 | 1/16 – 1/8 | Good | Good | 0.01 | 0.83 |
| 2 | 9.9 | 29.6 | Rotating | 647.0 | $7.7 \times 10^{-6}$ | 0.75 | 97.8 | 0.328 | 1/16 – 1/8 | Good | Good | 0.01 | 0.83 |
| 3 | 10.1 | 30.2 | Rotating | 657.0 | $9.4 \times 10^{-6}$ | 0.91 | 100.8 | 0.328 | 1/16 – 1/8 | Good | Good | 0.01 | 0.83 |
| 4 | 0 | 0 | Stationary | 0 | 0 | 45.4 | 0 | 0.503 | 1/8 – 1/4 | Poor | Poor | 0 | 0 |
| 5 | 0 | 0 | Stationary | 0 | 0 | 57.0 | 0 | 0.392 | 1/8 – 1/4 | Poor | Poor | 0 | 0 |
| 6 | 0 | 0 | Stationary | 0 | 0 | 36.2 | 0 | 0.577 | 1/8 – 1/4 | Poor | Poor | 0 | 0 |

*Ratio of total cross-sectional area of gas streams to the swept area
**Number of gas streams per square inch of swept area It is quite evident from Table II and photographs of the bubbles population that the rotating sparger containing 1/8 inch diameter openings produced much smaller bubbles than did the stationary sparger containing smaller 1/32 inch diameter openings. The bubbles produced by the rotating sparger averaged between 1/16 and 1/8 inch in diameter while those produced by the stationary sparger (Test 6) were 1/8 to 1/4 inch diameter.

It was also observed photographically that bubbles produced by the rotating sparger are very uniform in size compared to those from the stationary sparger. Uniformity is important and desirable particularly for the exclusion of very large bubbles, since only a few such bubbles can account for a significant fraction of the total gas volume. Thus, a small number of oversized bubbles will materially reduce the bubble population and interfacial area per unit volume of gas in the system.

The improved stability of the small bubbles produced by this invention, even with a very dense population of bubbles, is also quite evident from the data. A review of Tests 1, 2, and 3 show that the small bubbles from the rotating sparger remained discrete and separate despite an increase in gas flow rate of about 60%. By comparison, the larger bubbles of stationary sparger Tests 4, 5 and 6 showed a strong tendency to coalesce and this tendency was greatly aggravated by increasing the gas rate by about 60%. It should not be concluded from the data of Table II that the use of 1/32 inch diameter orifices in the rotating sparger of the present invention is unsatisfactory. If the stationary sparger provided with 1/32 inch diameter orifices had been rotated at appropriate velocity, the size of the bubbles produced thereby would have been as small as or smaller than those produced in the ⅛ inch orifice tests. The employment of smaller orifices in the stationary tests than in the rotating tests emphasizes the fact that the benefits of the present invention cannot be achieved in a stationary sparger by reducing the orifice size.

In the aforedescribed tests, eight radial baffles were provided at equal spacings around the shroud circumference in a spoke-like configuration positioned between the shroud wall and a 2-inch inner ring. These baffles were 2 inches long in the longitudinal direction (parallel to the rotating shaft) and were positioned above the sparger to inhibit rotation of the liquid within the shroud. An attempt was made to operate the sparger with the baffles removed. However, it was found that a "chimney effect" occurred at the center of the column and was caused by a rapidly rising channel of huge bubbles which had coalesced near the center of the sparger. The vertical radial baffles prevent liquid rotation and therefore increase relative tangential velocity $V_t$ at a given sparger RPM (a higher $N^2D^2$ factor). Huge bubbles occur when $V_t$ is low, i.e. less than 4.5 fps. ($N^2D^2 = 21$).

In other tests conducted with the same system and observed by high-speed motion picture film, the speed of rotation of the sparger was progressively increased from zero while maintaining constant fluid flow rates. The films showed that a minimum tangential velocity of about 4.5 fps. was required at the innermost opening of this particular system in order to produce the desirable cloud of stable, small diameter bubbles in the liquid. At this rotational speed, the tangential velocity of the outermost orifice was about 14 fps. ($N^2D^2 = 21$). At lower velocities the aforedescribed chimney effect was observed with the characteristically huge bubbles.

The ability of the rotating sparger to rapidly dissolve oxygen gas into the liquid was determined directly by measuring the dissolved oxygen in the liquid at the base of the mixing chamber immediately downstream of the sparger with respect to liquid flow (point 1) and at the liquid feed point to the chamber about 5 feet upstream of the sparger (point 2). The results of typical measurements (using data points selected at entering liquid DO levels of about 10, 15, 20 and 30 ppm) are summarized in Table III:

TABLE III

| Test No.* | Sparger | DO Level PPM 1 | 2 | DO Change PPM 1 − 2 |
|---|---|---|---|---|
| 1 | Rotating | 18.12 | 10.59 | 7.53 |
| 1 | " | 22.00 | 15.05 | 6.95 |
| 1 | " | 26.10 | 20.10 | 6.00 |
| 2 | " | 21.07 | 10.71 | 10.36 |
| 2 | " | 25.17 | 15.41 | 9.76 |
| 2 | " | 29.53 | 20.90 | 8.63 |
| 3 | " | 21.42 | 9.93 | 11.49 |
| 3 | " | 26.43 | 15.80 | 10.63 |
| 3 | " | 30.20 | 20.28 | 9.92 |
| 3 | " | 33.70 | 25.07 | 8.63 |
| 3 | " | 37.11 | 30.30 | 6.81 |

*Numbers correspond to tests numbers in Table II

These data show that the instant method may be used to transfer oxygen gas to water over a wide range of initial DO concentrations.

Dissolved oxygen data was taken which permitted a comparison of the overall effectiveness of the test chamber with the stationary sparger and with the rotating sparger. The following Table IV shows the DO level of water in and out of the chamber and the DO change which occurred. Data is selected for a consistent entering DO level of about 10 ppm.

TABLE IV

| Test No.* | Sparger | DO Level PPM In | Out | DO Change PPM |
|---|---|---|---|---|
| 1 | Rotating | 10.59 | 18.12 | 7.53 |
| 2 | " | 10.71 | 21.07 | 10.36 |
| 3 | " | 9.93 | 21.42 | 11.49 |
| 4 | Stationary | 10.40 | 12.81 | 2.41 |
| 5 | " | 10.13 | 12.55 | 2.42 |
| 6 | " | 10.23 | 11.37 | 1.14 |

*Numbers correspond to test numbers in Tables II and III.

The Table IV test show that the rotating sparger transferred at least five times as much oxygen to the liquid as the stationary sparger. It should be noted however that the Table II–IV tests do not represent a quantitative comparison of the invention with the prior art because of the low gas lineal velocities (0.56–0.91 fps.) and even more importantly the low downward liquid lineal velocity (0.33 fps.). Under these circumstances the gas bubbles actually rose through the column of liquid and were not swept downwardly from the lower end of the sparging zone with the liquid. As previously discussed, the high mass transfer rates characteristic of this method require gas lineal velocities of at least 5 fps. into the liquid, and liquid downward velocities of velocitiesof at least 2 fps.

Another series of tests were conducted with the aforedescribed rotating sparger system, except that all gas injection openings on each of the eight radial arms were masked except outermost openings located on a radius of 5.25 inches. This was done in order to eliminate one of the many variables which had been present in previous tests of the rotating sparger. Am important objective of these particular tests was to study the effect of tangential gas velocity and rotating speed on bubble diameter, and by placing all openings on the same circle the tangential velocity of all openings was uniform. Vertical radial baffles were employed above and below the rotating sparger.

The apparatus was operated with air at various rotating speeds, hence at several tangential velocities of the air streams, with the character of the gas dispersion in the liquid being recorded photographically. For each condition (RPM or air tangential velocity), a representative group of bubbles were measured, and the size distribution of the bubbles within the group was determined. The results are shown on FIG. 7 for six different values of the factor $N^2D^2$ as previously defined. This data is specific for ⅛ inch diameter openings immersed 5.8 feet below the water surface and for a gas lineal velocity of 12.2 fps. (NTP) through each injection opening. This gas lineal velocity through only eight orifices provides a gas flow rate of only about 0.011 actual cubic feet of gas per second per square foot of horizontal sparger area. The gas flow rate is below the 0.06 lower limit specified herein, but the purpose of the instant tests was to study bubble size distribution and not to obtain a high degree of mass transfer efficiency. The number of bubbles produced was more than adequate to show the size distribution in a statistically accurate manner.

The use of FIG. 7 may be illustrated as follows: at a gas stream relative tangential velocity of 8.7 fps. ($N^2D^2 = 8.4$), at least 90% of all the bubbles within a selected sample will be 0.37 inch diameter or smaller. Similarly, at 11.5 fps. relative tangential velocity ($N^2D^2 = 14.6$) 90% of the bubbles within a selected sample will be smaller than 0.18 inch diameter. The graph is plotted on coordinates wherein the abscissa is a probability scale, so that a bubble population which fits a normal bell-shaped distribution curve will fall on a straight line. It is seen that at low gas stream tangential velocities increasing from 0 to 10.1 fps. (values of $N^2D^2$ from 0 to 11.2), bubble distribution is not normal, since inordinately large-size bubbles are formed in relatively large numbers. However, a small additional increase in tangential velocity to 11.5 fps. ($N^2D^2$ of 14.6) results in a sudden change in the bubble population, whereby smaller bubbles are produced which fit a normal distribution curve. It appears that the large bubbles occurring at low relative tangential velocity are produced (1) by continued growth at the gas injection opening in the absence of shear forces sufficient to disengage the bubbles from the sparger, (2) by coalescence of adjacent bubbles within the liquid after disengagement occurs, and (3) by the stable assistance of the large bubbles in the relatively low turbulence level of the liquid in the sparging zone. At the higher velocities, the shear forces are greater and bubble growth at the opening tends to be limited to a bubble diameter not larger than the opening diameter. The smaller bubbles produced at the opening and in the high shear-turbulence zone in the wake of the sparger arms are less likely to coalesce in the liquid.

Figure 7:
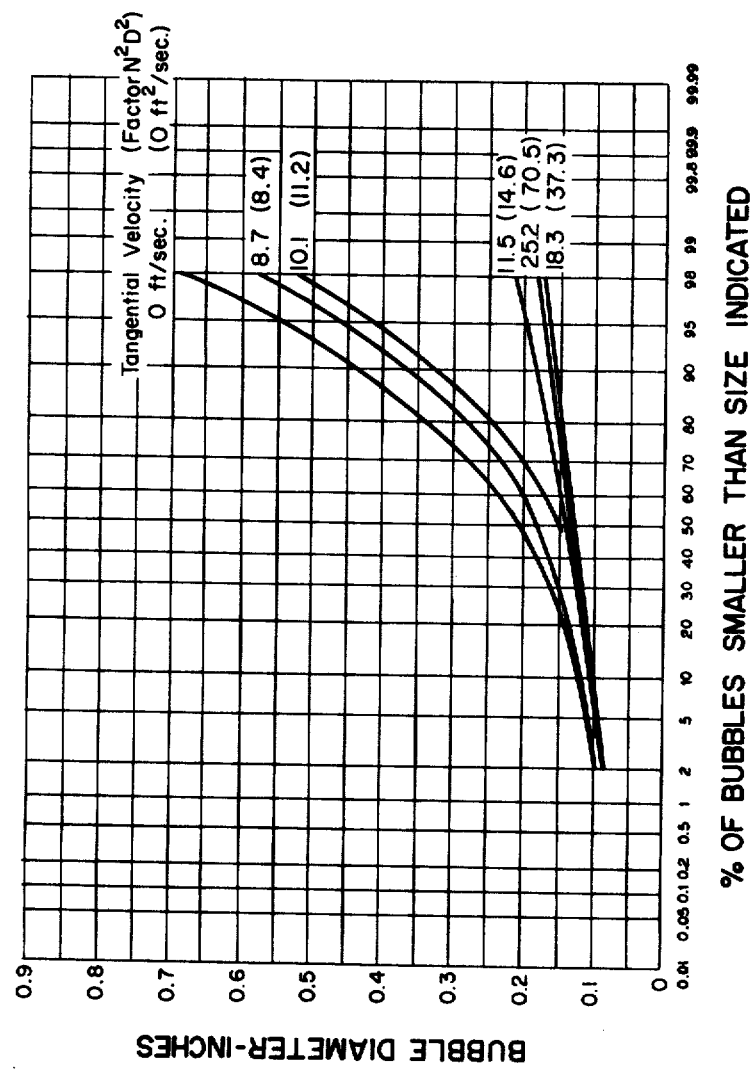
FIG. 7 is a graph illustrating the relation between bubble size distribution and the factor $N^2D^2$ representative of energy developed by the sparger in the sparging zone.
Figure 8:
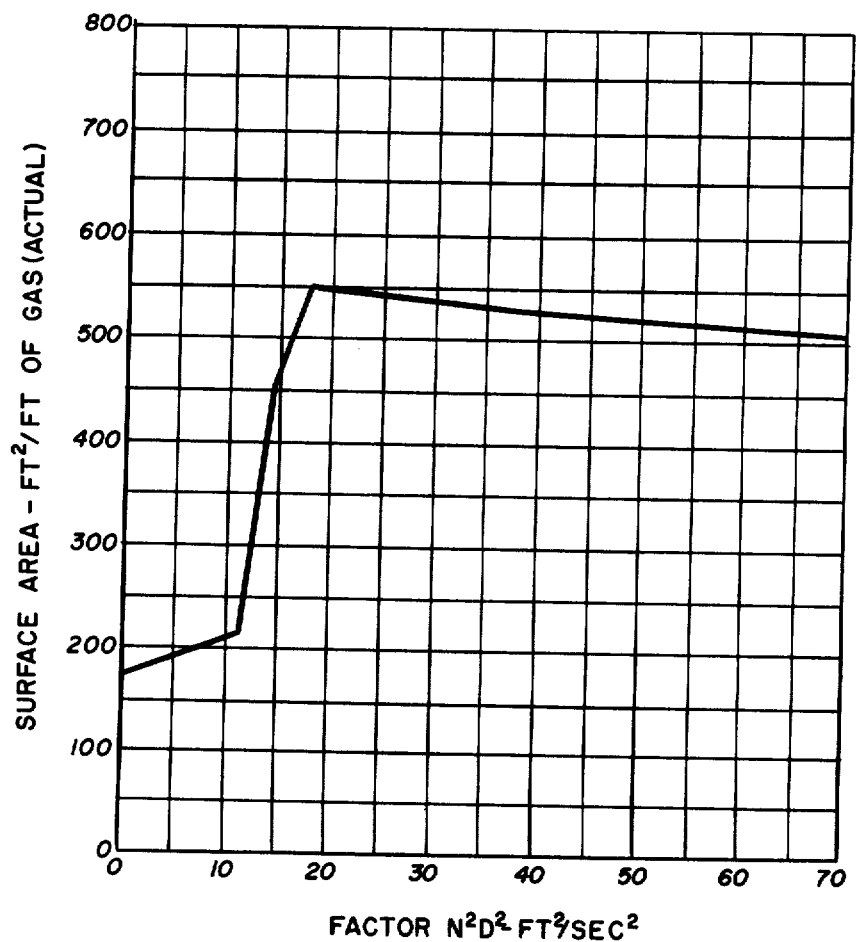
FIG. 8 is a graph illustrating the relation between gas-liquid interfacial surface area/volume ratio and the factor $N^2D^2$.

FIG. 8 is based on the same data as FIG. 7. The ordinate is the ratio of gas bubble surface area to gas quantity and is therefore an indicator of the gas-to-liquid mass transfer effectiveness. FIG. 8 illustrates the importance of tangential velocity and turbulence to the present invention in a more dramatic manner than FIG. 7. At low values of $N^2D^2$ below about 11.2, large unstable bubbles were produced and the surface area of gas created in each cubic foot (NTP) of gas injected into the liquid was about 200 square feet or less at higher values of $N^2D^2$ of about 14.6 and above, the small stable bubbles provide a surface area of about 450 square feet and higher for each cubic foot of injected gas. The transition between these two conditions is quite abrupt.

As previously indicated, the FIGS. 7–8 data is based on a single volumetric rate of gas introduction into the sparging zone. Moreover, the liquid downflow rate through the sparging zone was quite low as the objective was to suppress rather than reverse the buoyant upward rise of the bubbles and thereby facilitate close inspection of bubble size. Additional tests were conducted at other volumetric flow rates of gas into the sparging zone and again it was found that for each gas rate a rather abrupt transition in bubble size occurred in a specific unique range of rotating speeds (or $N^2D^2$). It was also observed that as gas sparging rates increased, the rotating speed factor $N^2D^2$ required to reach the small, stable bubble regime increased correspondingly.

In yet another series of tests, the volumetric gas flow rate, the liquid downflow rate and the sparger rotating speed were varied. In some tests, no impeller was employed so that the liquid downflow rate was essentially zero. An impeller was used in other tests, and by substituting impellers of different pitch/diameter ratio, the liquid downflow rate was varied independently of the sparger rotating speed. These tests were conducted in a tank 8 by 8 feet cross-section and 9 feet deep filled with water to a depth of 8 feet.

The sparger was provided with eight arms each 11 inches from tip to shaft center and was submerged 6.2 feet (22 inches from tank bottom). A three-blade marine-type propeller of selected pitch/diameter ratio was installed on a common shaft 11 inches above the plane of the sparger (corresponding to the aforementioned vertical distance between impeller blade and sparger arm horizontal center planes). Each arm of the sparger was provided with 26 ⅛ inch diameter orifices located along upper and lower surfaces thereof with variable spacing ranging from ½ inch center-to-center distance (for outer holes) to 1 inch (for inner holes). A source of air was provided to the hollow shaft with means to control and measure the flow rate. Provision was also made to vary and measure the rotating speed of the shaft.

Figure 9:
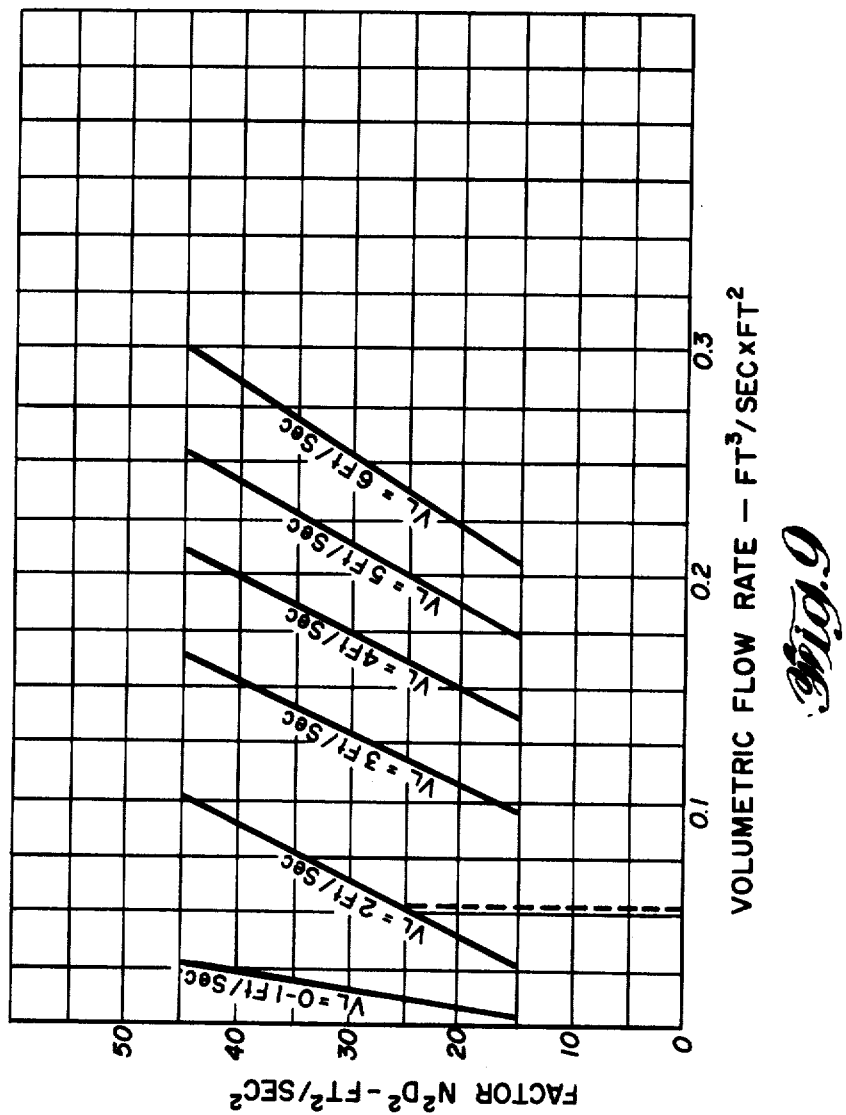
FIG. 9 is a graph illustrating the relation between the volumetric flow rate of gas introduction per square unit of sparging zone horizontal area and the factor $N^2D^2$. The relationship is shown parametrically in terms of the downward liquid velocity through the sparging zone.

The results of the tests are shown on FIG. 9 which is a graph with $N^2D^2$ (ft.$^2$/sec.$^2$) as ordinate and with volumetric gas flow rate (actual cubic feet per second per square foot horizontal area of the sparger zone) as abscissa. The incipient flooding boundaries of the propeller/sparger at various values of downward liquid velocity $V_1$ are shown as a series of curves on the graph. FIG. 9 shows the limiting value of liquid downflow $V_1$ which is required for a desired pairing of values of $N^2D^2$ and gas flow rate. Thus, if it is desired to introduce 1.6 actual cubic feet gas per second per square foot sparged area using a value of $N^2D^2$ of 30, then the liquid downflow rate should not be less than about 3.5 ft./sec.

An important observation during this series of tests was the strong dependence of system performance on the liquid downflow rate. As liquid velocity was increased above 2 feet/second the sparger's capability to disperse gas into small bubbles increased greatly even though its speed of rotation was held constant. Therefore, the volumetric gas flow rate of the sparger could be increased to much higher values without necessarily increasing the rotational speed of the sparger. Thus, in addition to the aforementioned relationship between volumetric gas flow rate and $N^2D^2$ which permits higher gas flow rates at higher rotational speeds, the gas capacity can be further increased by increasing the liquid downflow velocity.

Below the value of 2 ft./sec. liquid rate is a regime in which the downward liquid velocity approaches the terminal liquid velocity of the bubbles. The bubbles still cannot escape upwardly by their buoyancy, and the liquid velocity becomes too low to sweep the bubbles downwardly out of the sparging zone as rapidly as they are produced. Total flooding results as the accumulating gas bubbles in the sparging zone coalesce into large pockets of gas which rise into the propeller and the system becomes incapable of producing and dispersing small bubbles. If liquid velocity is still further diminished below the terminal velocity, a steady state small bubble regime again appears at low volumetric gas flow rates, but such gas rates are far below 0.06 actual cubic feet per second per square foot horizontal area of the sparging zone and too low for practical usage. The region of operability according to the method of this invention may be identified on the FIG. 9 graph. The vertical dotted line for gas flow rate ($\phi$ g) = 0.06 ft.³/sec. × ft.² is the minimum value of this parameter for achieving an effective balance of mass transfer and power consumption. The incipient flooding curve $V_1 = 2$ also represents a lower limit on liquid lineal velocity needed to achieve high mass transfer rates ($K_{1a}$) and to effectively disperse the gas bubbles from the sparging zone. Also, the horizontal line for the factor $N^2D^2 = 15$ is the lower limit for acceptably high mass transfer rates.

It will be understood by those skilled in the art that despite the coupling of the impeller and sparger to a common shaft, the liquid pumping rate of the impeller can be varied independently of the rotational speed by changing the pitch/diameter ratio of the impeller. On preferred practice of this invention the pitch/diameter ratio of the impeller is at least 1.5. It has been observed that by changing the pitch/diameter ratio from 1.0 to 1.5 and holding the factor $N^2D^2$ constant, the gas rate can be increased over 50% and the mass transfer rate over 75%.

Although the aforedescribed tests related to sparging systems employing 1/16 to ¼ inch diameter gas injection openings, the general relationships set forth are believed applicable to 1/32 inch openings and such may be used in the practice of this invention. Openings smaller than 1/32 inch diameter are subject to clogging where the liquid contains solid materials. It also appears that saturation of the gas (to be injected in the liquid as a multiplicity of streams) becomes more important as the opening diameter and gas stream diameter is reduced, so as to avoid evaporation and solids disposition in the openings. Openings larger than ¼ inch do not provide the small bubbles necessary for a high gas-liquid interfacial surface area/volume ratio under conditions wherein shear action (and not turbulence) is primarily relied on to form small bubbles, i.e., low tangential velocity and low $N^2D^2$. This is illustrated by Table V which is based on the approximation that at stable operation, the mean bubble diameter is about the same as the gas injection opening diameter. It should be recognized however that several other factors could influence the relationship between opening diameter and stability of operation, such as hydrostatic head and gas injection opening profile.

TABLE V

| Opening Diameter Inches | Corresponding Mean Bubble Dia.-ft. | Area/Volume Ratio -ft²/ft³ |
|---|---|---|
| 1/32 | 0.0026 | 2310 |
| 1/16 | 0.0052 | 1155 |
| 1/8 | 0.0104 | 575 |
| 3/16 | 0.0156 | 385 |
| 1/4 | 0.0208 | 288 |
| 3/8 | 0.0313 | 193 |

Figure 2:
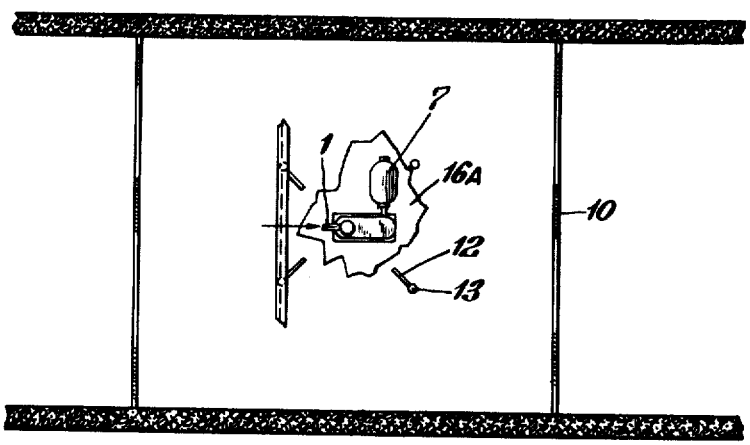
FIG. 2 is a plan view looking downwardly on the FIG. 1 system with a portion of the cover being cut away.

Still another series of tests were conducted with large scale equipment schematically illustrated in FIGS. 1–2. Tank 10 had 2700 gallons liquid capacity and was 7 feet in diameter. Whereas liquid was recirculated in the desired flow path of an external pump in the small scale tests, in the large scale tests propeller 4 was mounted on hollow shaft 2 above eight-arm sparger 5 also mounted on this shaft. The latter was powered by motor 7 (¾ HP direct current type). During certain of these tests vertical radial baffles 12 were attached to the tank wall at 90° intervals, and various other vertical radial baffles 9a–9a were provided around the propeller-sparger assembly, also at 90° intervals.

Some tests employed an 18 inch diameter, 18 inch pitch propeler while others used an 18 inch diameter, 27 inch pitch propeller. Several sparger embodiments were employed, all consisting of eight radial arms in an enscribed circle, 18 inch in diameter. These arms were fabricated of 5/16 inch O.D. tubing which was flattened to about 3/16 inch width along the portion of the length containing the openings to provide a substantially flat configuration with a major axis $A_{ma}$ of 0.25 inch and minor axis $A_{mi}$ of 0.06 inch. One design used straight arms, each containing twelve ⅛ inch diameter orifices spaced ½ inch apart (four diameters) in the top of the arms beginning ¼ inch from the arm tip (96 total openings). The ratio of total cross-sectional area of openings and gas streams to the swept area was 0.018 with 1.46 openings and gas streams per square inch of swept area. This sparger was tested with the openings facing upward, facing downward, and facing at an acute angle to the vertical. In other tests, the above sparger was modified by drilling the holes completely through the tube arms, thus providing 96 openings on the top and 96 on the bottom (192 total openings). In still other tests, the number of openings was again doubled by drilling additional ⅛ inch diameter holes through the tube arms midway between the existing openings (384 total openings). Yet another sparger containing 192 openings was tested using arms curved in the horizontal plane on a radius of about 15½ inches.

In some tests, the full array of narrow radial baffles 9a–c were employed. In other tests, only the bottom narrow baffles 9a was retained, while in still others all narrow radial baffles were removed but in all tests the long baffles 12 were employed.

During these tests, it was determined that outstanding performance (in terms of transferring gas as small bubbles to liquid through ⅛ inch diameter openings) can be obtained whether the openings are provided in the top, bottom, or both sides of the sparger arms. However, in all of these configurations, the center axis of the opening had a vertical direction component and the gas streams were injected in a direction having a vertical component. It was also determined that narrow straightening baffles 9a–c are not required to avoid vortex formation in larger tanks where the mass of liquid being circulated (for sweeping the gas bubbles away from the sparging zone) is small in relation to the mass of the total liquid body. However, long radial baffles 12 were employed and the apparatus of this invention requires some type of vertical radial baffles at spaced intervals around the lower end of the rotatable shaft.

Although preferred embodiments of this invention have been described in detail, it is contemplated that modifications of the method and apparatus may be made and that some features may be employed without others, all within the spirit and scope of the invention. For example, the gas injection openings in the sparging arms need not be provided in a single longitudinal row but may instead be provided in multiple. In this event, the requirement of center-to-center spacings at least two diameters refers to any pair of adjacent openings whether they be in the same or different rows.

Figure 10:
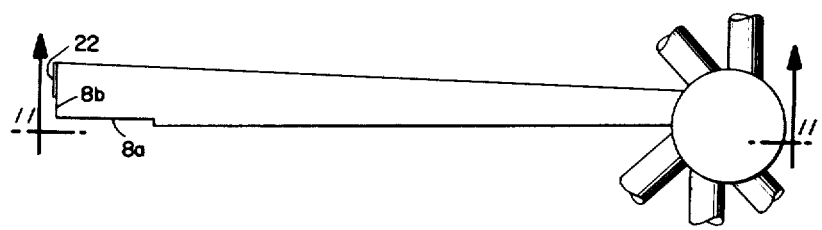
FIG. 10 is a plan view looking downwardly on one arm of an alternative sparger assembly.
Figure 11:
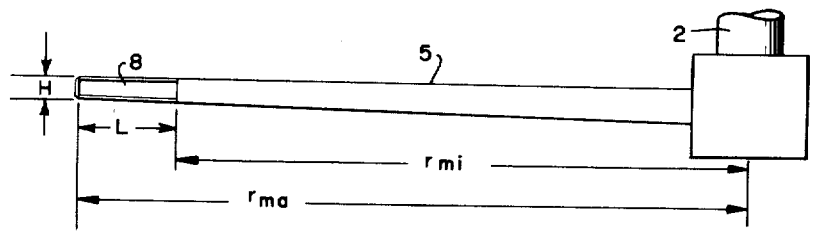
FIG. 11 is an elevation view taken along line 11—11 of the FIG. 10 assembly.

The specific embodiments of the invention hereinbefore described all involve small discrete orifice-type openings in the sparger arms, for discharging a multiplicity of small gas streams of about the same diameter at the desired 1/32 – ¼ inch diameter bubbles. In the preferred practice, a single gas stream is discharged through a slot-type opening 8 as illustrated in FIGS. 10 and 11. This opening extends from the outer end of sparger arm 5 toward the inner end and along trailing edge 8a. The opening also extends part way around the outer end as section 8b, with the remainder closed by cap 22. The latter feature is desirable when the liquid contains solid material, so that any debris will be flung outwardly. It will also be apparent that a single slot-type opening minimizes the possibility of plugging which might otherwise occur with small orifice openings. Finally, slots are in general less expensive to form than small orifices.

Table VI summarizes several method and apparatus embodiments based on the slot-type sparger opening of FIGS. 10 – 11. The plants are used for the biochemical treatment of waste water using oxygen gas in several covered zones or stages, with the aeration gas and the partially oxygenated liquor from each stage flowing cocurrently to the next succeeding stage in the manner described in U.S. Pat. No. 3,547,815 to J. R. McWhirter. The biological oxygen demand (BOD) of the incoming waste water is 140 mg/l. for plant 1, 165 mg/l for plant 2, and 1700 mg/l. for plant 3. The width of open flat section 8b of the sparger slots 8 are 1.1 inch for plant 1, 0.88 inch for plant 2, and 0.75 inch for plant 3. The total widths of the flattened end sections of these sparger arms (comprising open section 8b plus cap section 22) are 2.15 inch for plant 1, 2.25 inch for plant 2, and 2.15 inch for plant 3. It will be noted from FIG. 11 that in the slot-type sparger the minimum radii $R_{mi}$ is measured from the slot inner edge whereas the maximum radii $R_{ma}$ is measured from the slot outer edge. In the practice of the instant method, the gas stream or streams are preferably orbited at tangential velocity of 18 – 26 feet per second to achieve the desired turbulence in the sparger zone and yet avoid a tendency towards the cavitation phenomenon, thereby insuring the formation of small bubbles. The factor $N^2D^2$, representative of the energy developed by the sparger in the form of turbulence and shear of the liquid acting on the gas bubbles, is most preferably in the range of 30 – 70 for the same reasons.

Another difference between the FIG. 10 – 11 embodiment and those previously described is that the gas is not discharged into the sparging zone in a direction having a vertical component, so that liquid turbulence rather than shear is the principal effect relied on to form small bubbles.

The spargers of the aforementioned plants are mounted on vertically oriented rotatable shafts beneath axial flow impellers, also mounted on the shafts as illustrated in FIG. 1. The impellers are the pitch blade turbine type, all with a 32° pitch, and the dimensions are summarized in Table VII.

TABLE VII

| Plant and Stage No. | | Turbine Diameter (inches) | * W/D ratio |
|---|---|---|---|
| Plant 1, | Stage 1 | 104.25 | 1/6.58 |
| | Stage 2 | 101.5 | 1/6.6 |
| | Stages 3–5 | 103 | 1/6.55 |
| Plant 2, | Stage 1 | 89 | 1/6.6 |
| | Stages 2–4 | 85 | 1/6.6 |
| Plant 3, | Stages 1–3 | 96 | 1/6.55 |

* W is the vertical projection of the turbine blade.

What is claimed is:

1. A method for sparging gas into liquid comprising the steps of injecting into liquid one gas stream at lineal velocity of at least 5 feet per second and at volumetric flow rate of at least 0.06 actual cubic feet per second per square foot of horizontal area in a sparging zone as gas bubbles in a horizontal direction, and simultaneously orbiting said gas stream at tangential velocity of 18–26 feet per second and at rate such that the factor $N^2D^2$ is 30–70 feet$^2$ per second$^2$ about a common vertical axis so as to scribe a swept area when projected on the horizontal plane bounded by circles of minimum and maximum radii, wherein N is the speed of sparger arms and impeller blade rotation (in revolutions per second), and D is the diameter of the circle which is circumscribed by the tips of the sparger arm (in feet), each perpendicular to said vertical axis, the ratio of total cross-sectional area of said gas stream to said swept area being 0.006 – 0.06, thereby forming a multiplicity of discrete gas bubbles of 1/32 – ¼ inch in said sparging zone; flowing said liquid at lineal velocity of at least 2 feet per second downwardly through said sparging zone for gas injection therein; and discharging the downwardly flowing gas bubble-containing liquid from the lower end of said sparging zone.

2. Apparatus for sparging gas into liquid comprising:
a. pressurized gas supply means;

TABLE VI

| Plant and Stage No. | Slot Height H(inches) | Slot Length L(inches) | End Radius $r_{ma}$(inches) | RPM | Gas $V_L$ (fps) | Gas Flow Rate* | Tang.$V_t$ (fps)** | $N^2D^2$ | Liq'd $V_d$ (fps) |
|---|---|---|---|---|---|---|---|---|---|
| Plant 1 | | | | | | | | | |
| Stage 1 | 1 | 6.75 | 53 | 56 | 65 | 0.26 | 26 | 68 | 9 |
| Stage 2 | 1 | 4.5 | 48 | 56 | 97.5 | 0.31 | 23.5 | 56 | 9 |
| Stages 3,4&5 | 1 | 3.0 | 48 | 45 | 103 | 0.22 | 18.8 | 36 | 9 |
| Plant 2 | | | | | | | | | |
| Stage 1 | 0.75 | 4.1 | 44.5 | 56 | 80 | 0.15 | 21.8 | 48 | 4.6 |
| Stage 2 | 0.75 | 3.9 | 42.5 | 56 | 69 | 0.18 | 20.8 | 44 | 4.6 |
| Stage 3 | 0.75 | 3.0 | 42.5 | 56 | 67 | 0.14 | 20.8 | 44 | 4.6 |
| Stage 4 | 0.75 | 3.9 | 42.5 | 56 | 69 | 0.18 | 20.8 | 44 | 4.6 |
| Plant 3 | | | | | | | | | |
| Stage 1 | 1.42 | 3.1 | 48 | 56 | 55 | 0.16 | 23.5 | 56 | 9.5 |
| Stage 2 | 1.42 | 3.5 | 48 | 56 | 48 | 0.16 | 23.5 | 56 | 9.5 |
| Stage 3 | 1.42 | 4.4 | 48 | 56 | 43 | 0.18 | 23.5 | 56 | 9.5 |

*Oxygen gas flow rate, ft$^3$/sec./sq.ft. of horizontal area in sparging zone
**Oxygen gas stream tangential velocity
All plants have eight arms per sparger, each formed from 2.875 inch OD stainless steel pipe and flattened to 2.15 – 2.30 inch width at the end.

b. a vertically oriented rotatable shaft having a passageway therein joined at its upper end to said gas supply means;

c. an axial flow impeller fixedly attached to said rotatable shaft with outwardly extending blades intermediate said upper end and the shaft lower end aligned to flow liquid downwardly;

d. a multiplicity of gas sparging arms fixedly attached to said rotatable shaft at its lower end, each extending radially outwardly from and spaced around the shaft with the diameter scribed by the arm tips 0.8 – 1.1 times the diameter scribed by the impeller blade tips and each arm having an interior passageway communicating with the rotatable shaft passageway, and a single slot type opening in part of each arm end and extending therefrom along the trailing edge toward the inner end so as to scribe when projected on the horizontal plane a swept area bounded by the circles of minimum and maximum radii, said slot-type openings being provided in sufficient size that the ratio of total cross-sectional area of said openings to said swept area is 0.006 – 0.06; and e. a multiplicity of vertical radial baffles at spaced intervals around the lower end of said rotatable shaft.

* * * * *